April 30, 1940.  J. CAHN  2,198,958

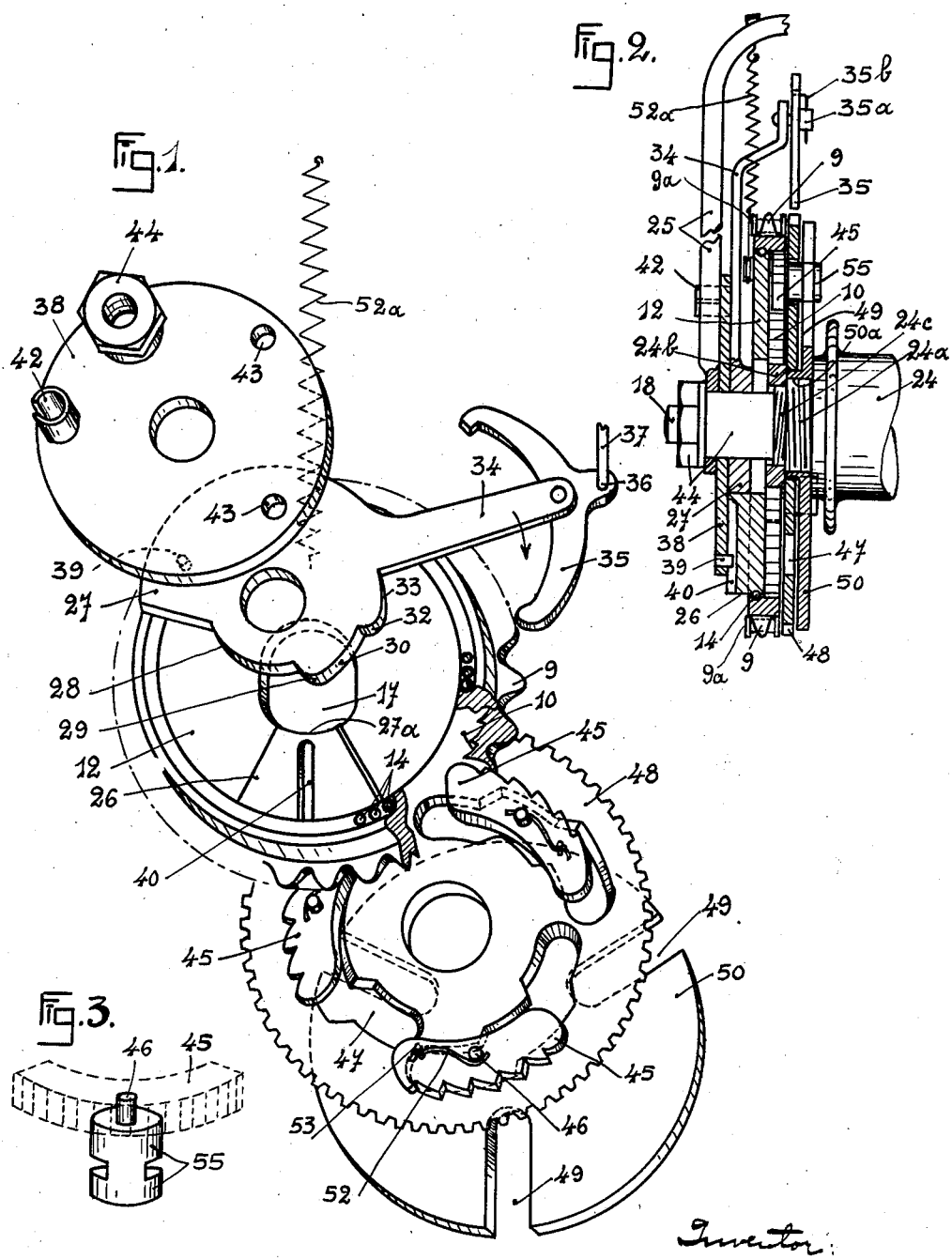

CHANGE SPEED GEAR SYSTEM

Filed April 21, 1937  2 Sheets-Sheet 2

Inventor:
Joseph Cahn
by Richard E. Babcock
Attorney

Patented Apr. 30, 1940

2,198,958

UNITED STATES PATENT OFFICE 2,198,958

CHANGE SPEED GEAR SYSTEM

Joseph Cahn, Liege, Belgium, assignor of one-half to Hermann Feigenbaum, Leige, Belgium Application April 21, 1937, Serial No. 138,249
In Belgium April 27, 1936

5 Claims. (Cl. 74—325)

The present invention relates to change-speed gears for bicycles and like vehicles and has for its principal object to provide a new or improved gear which will permit of two, three or any other number of different speeds being obtainable.

A change-speed gear in accordance with the present invention comprises a driving and a driven gear wheel, the driving gear being provided with inwardly extending teeth and being fixed relatively to a chain driven sprocket or the like, whereas the driven gear is of variable pitch-diameter and rotates with the hub or the like of one of the vehicle road-wheels, the said driving gear being radially displaceable relatively to the said hub or the like.

Preferably the radial displacement of the driving gear and the variation in the pitch radius of the driven gear are effected in synchronism and are of equal dimensions, and since the said diameter may be varied to any extent (within reasonable limits) an indefinite number of different speed ratios may be provided.

Two applications of the invention, to a three-speed gear and to a multiple-speed gear, are shown in the drawings, in which:

Figure 1 is a perspective exploded view of the three-speed gear and

Figure 2 is an axial section through the three-speed gear according to Figure 1, showing the various component parts in assembled position.

Figures 3, 4 and 5 are views of details.

Figure 4:
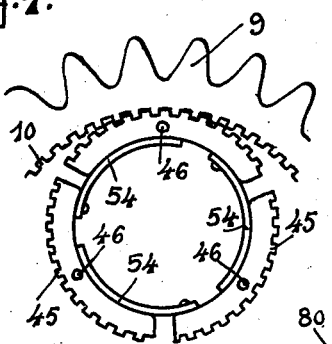

The change-speed gear shown in the said drawings comprises an annular chain-driven wheel 9 which is mounted around the spindle 18 of the rear road wheel of a cycle or similar vehicle intermediate the hub 24 of the said wheel and the lug 25 of the rear fork of the cycle frame, the said sprocket being adapted to be displaced radially with respect to the said spindle and being provided with a system of internal ratchet teeth 10.

This annular sprocket wheel is located by a set of balls 14 which are adapted to run around the periphery of a disc-like element 12, the outer face, that is the face remote from the hub 24, of which is recessed, with the exception of the portion 26.

A lever or key 27 is rotatably mounted upon the spindle 18 and is so housed within the recessed outer face of the disc 12 that its periphery bears upon the edge 27a of the projecting portion 26 of the said disc and is adapted to displace the disc 12 and sprocket 9 radially with respect to the spindle as described below. To permit of this radical movement being imparted to the said disc and sprocket, the edge of the lever is so profiled that it comprises three arcuate portions 28, 30 and 33, which are located at successively increasing distances from the spindle 18 and separated from one another by the steps or cams 29 and 32. The lever also comprises an arm 34 to the fore end of which an oscillatory anchorlike member 35 is attached, one end of a rod 37 being connected to the said member 35 whilst its other end terminates at some part of the cycle within reach of the cyclist's hand.

Normally the lever 27 is retained within the recessed face of the disc 12 by a plate 38, which is also carried upon the spindle 18 and this plate is provided on its inner face with a pin 39 which projects into a radial slot or groove 40 provided in the projecting disc portion 26 and, since the plate 38 is fixed relatively to the cycle frame, this pin guides the radial movement of the disc 12 when displaced by the stepped periphery of the lever 27. The outer face of the plate 38 is provided with a projecting sleeve 42 which engages with the fork-lug 25 and prevents the said plate from rotating on the spindle, and this sleeve may be mounted in any one of a system of holes 43 formed in the plate 38 so that it may engage with the lug 25 whatever the position of the latter may be upon the cycle fork.

A system of three toothed sectors 45 are located on the opposite side of the annular sprocket to the disc 12, these sectors being located in the plane of the ratchet-teeth 10 with which they are adapted to mesh either simultaneously as a clutch or successively as a gear according to whether the direct or a geared speed is selected.

These toothed sectors are supported on or carried by pins 46 embodying guiding portions 55 (see Figure 3) which are adapted to pass through arcuate slots 47 of a toothed plate 48 into radial slots 49 of a guide plate 50 fastened to the end of the hub 24 of the cycle road wheel, and the sides of the arcuate slots 47 are so stepped that they have the same profile as the stepped edge 28, 29, 30, 32 and 33 of the lever 27, with the exception that the steps are arranged in the reverse order, that is to say, the arcuate edge nearest the spindle 18 is located at the right-hand end of the slot instead of the left hand end.

Each sector 45 is provided with a spring 52 which is secured to the complementary pin 46 and bears against a shoulder of similar projection 53 adjacent one end of the sector so that it tends to rotate the said sector and retain it in mesh with the ratchet teeth 10.

The above component parts are locked or retained in their assembled positions by a nut 44 which is screwed on to the end of the spindle 18.

As shown in Figure 2 plate 50 is screwed upon a right hand thread 24a of hub 24 and is retained by a nut 24b screwed on a left hand thread 24c of hub 24, (plate 50 could as well be keyed on the hub 24) and plate 48 is rotatably disposed on a hub portion 50a of plate 50.

Moreover it is to be observed that the anchor-like member 35 which serves to cooperate with the toothed edge of plate 48 is located on a pivot 35a fixed to arm 34 and is automatically held out of engagement with said toothed edge by the action of a spring 35b fixed to the pivot 35a and engaging member 35.

In the position shown in Figures 1 and 2 the guides 55 of the pins 46 are situated in the portions of the arcuate slots 47 which are furthest from the spindle 18 so that the teeth of the three sectors 45 mesh simultaneously with the ratchet teeth 10 and provide a direct drive from the annular sprocket 9 to the wheel-hub 24; this provides bottom or low speed. Simultaneously the arcuate portion nearest to the spindle 18 of the profiled cam edge of the lever or key 27 bears against the cam following edge 27a of the projecting disc-portion 26, the said edges being retained in intimate contact by a tension spring 52a which is connected between the disc 12 and the lug 25 or other suitable anchorage on the cycle fork; in this position the sprocket and disc unit is concentric with the spindle 18.

If the lever or key 27 is now rotated about the spindle 18 in the direction indicated by the arrow (Figure 1) by the manual actuation of the rod 37, one arm of the anchor-like member 35 engages the toothed edge of the plate 48 and rotates the latter in unison with the said lever with the result that the plate-and-sprocket unit, 9, 12 is displaced radially with respect to the spindle 18 by the cam 29 and the arcuate portion 30 of the lever hub comes into contact with, and supports, the edge 27a of the disc. Simultaneously (provided that the lever 27 is rotated more quickly than the plate 48) the three arcuate slots 47 are so displaced angularly relatively to the guides on the sector-supporting pins 46, that the said guides are taken out of the slot portions furthest from the spindle 18 into the adjacent portions which are closer to the said spindle so that the three toothed sectors, whilst still remaining spaced apart, are closed in radially towards one another, the radial displacement of each of the sectors being equal to the radial displacement of the unit 9, 12. Hence one of the said sectors will move in unison and remain in mesh with the ratchet teeth 10, whereas the other two sectors will move away from the said teeth, and the said sectors, although still held rigidly apart, constitute a composite gear which is of smaller diameter than the gear 10, is eccentric to the latter and is also smaller than the initial composite clutch-gear composed by the fully expanded sectors 45. As the chain driven sprocket 9 rotates, each sector of the composite sector-gear will mesh successively with the ratchet wheel 10 and the ratio of the gear 10 to the gear 45 will cause an overdrive of the plate 50 and the cycle hub and produce a higher gear speed namely second and middle gear.

By continuing the movement of the control anchor lever 35 the arcuate portion 33 of the lever 27 moves into contact with the edge 27a and imparts an additional lateral movement to the unit 9, 12; simultaneously, the portions of the slots 47 nearest to the spindle, will engage the sector pin-guides 55 and fully contract or close in the said sectors to form a continuous ring which is eccentric to and in mesh with the internal ratchet gear 10.

Third or high speed is thus obtained.

To reduce the gear speed the rod 37 is moved in the reverse direction so as to displace the cam lever 27 backwards when the unit 9, 12 is returned towards its initial position by the spring 52a and the other arm of the anchor-like member 35 engages the toothed periphery of the plate 48 and moves the latter in unison with the said cam lever 27.

When the cyclist is free-wheeling in any gear-speed the toothed sectors 45 will over-run the ratchet teeth 10 by virtue of the springs 52. It will be noticed that the driving gear and chain sprocket or the like are rotatably mounted on a support which is radially displaceable on the spindle of the road wheel transversely to the main direction of the sprocket driving chain or the like, 9a (Figure 2).

In change speed gears according to the present invention, applied to hubs with back-pedaling brake mechanism, the inwardly extending teeth 10 of the driving gear and the teeth of the sectors 45 of the driven gear will be preferably straight that is, of the spur-tooth shape (see Figure 4) so that such gears will remain in mesh with each other and cooperate in both directions of rotation, forward action causing propulsion, rearward action braking and no action free-wheeling.

According to the example shown in Figure 4 the toothed sectors 45 are engaged by an elastic split ring or springs 54 which open or close in accordance with whether the composite gear combined with the said ring or springs is expanded or contracted.

Figure 5:
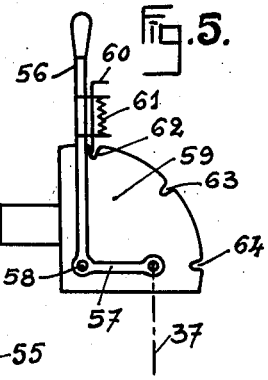

The transmission system 37 of any usual type, for instance a rod or cable system, may be actuated for instance by means of a double armed lever 56, 57 (see Figure 5) pivoted at 58 to a plate 59 which is attached to any suitable part of the vehicle for instance to the steering head tube. The lever-arm 56 is provided with any suitable kind of locking system, for instance such as the spring actuated slide 60—61 serving to enter into one of the notches 62, 63, 64, etc., on the plate 69 according to the position in which the system 37 and the parts controlled by it are to be arrested (first, second, third, etc., speed).

Figure 6:
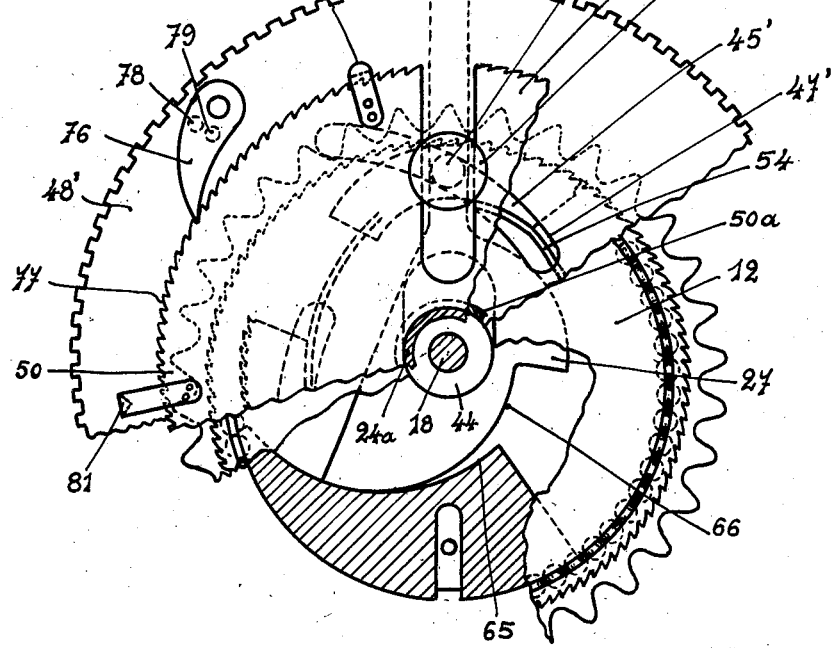
Figure 6, is a view of the multiple-speed-gear permitting to change the speed in a continuous manner, the different elements being partly broken away, for showing the elements situated behind.

The multiple-speed-gear shown in Figure 6 differs from the three-speed gear according to Figures 1 and 2, in that instead of stepped slots 47, there are provided in plate 48 continuous slots 47' for displacing the toothed sectors 45' (which can be toothed only on one side of the axes 46, whereas their end on the other side of said axes may be simply smooth), with their axes 46 and sliding supports 55 towards and away from each other. The supporting plate 12 and the lever 27 with arm 34, making part of the gear according to Figure 6 are provided, with cooperating continuous cam portions 65, 66 of a shape corresponding to that of slots 47'. In this case the sets of parts 45', 46, 55 may have the tendency, due to the working stress, to move towards the inner portion of the slots 47', this being impeded by at least one pawl 76 pivoted to plate 48 and cooperating with a correspondingly toothed portion 77 on plate 50. The plate 48 is provided, beneath the pawl 76 with for instance two small cavities such as 78, 79 whereas the pawl is provided for instance with a spring actuated ball (not shown) capable to enter into the one or the other of said cavities, according to the position of the pawl. The plate 50 is provided moreover with two abutments 80 and 81. Abutment 80 lifts the pawl 76 as soon as, by the manipulation of the key 34, 66 with its member 36, 55 in the direction of the arrow, the plate 48, with its slots 47', has been brought a little beyond the position of lowest speed, the pawl 76 remaining in the lifted position by virtue of its spring actuated ball entering then into the cavity 78. By the manipulation of the key 34, 66 in the opposite direction, the plate 48 is then brought to the position of greatest speed at which the abutment 81 pushes the pawl down into engagement with the toothed portion 77 of plate 50, the spring actuated ball of the pawl 76 being this time engaged into the cavity 79 thus holding the pawl in cooperative engagement with the toothed portion 77 of plate 50. If now the key 34, 66 with member 35 is again operated in the direction of the arrow, for instance each time through the pitch of one tooth of the toothed portion of plate 50, there will be obtained successively as many different speeds, from the greatest to the lowest, as there are different teeth 77 between abutments 81 and 80.

I claim:

1. A change speed gear for cycles comprising in combination a stationary spindle, a support radially displaceable on said spindle, a driving gear wheel having inwardly extending teeth rotatably mounted on said support, a hub rotatable on said spindle, a driven gear wheel of variable pitch-diameter fixed to said hub and meshing with said inwardly extending teeth of the driving gear wheel, and means mounted on said spindle and adapted to be moved only in parallel direction with respect to the plane of the pitch-circle of said gear wheels, to radially displace said support and to vary the pitch-radius of said driven gear wheel.

2. A change speed gear for cycles according to claim 1, in which said means for radially displacing said driving gear-support are adapted to perform synchronous and corresponding variations in pitch-radius of said driven gear.

3. A change speed gear for cycles, comprising in combination a spindle for a road-wheel, a support radially displaceable on said spindle, a driving gear wheel having inwardly extending teeth rotatably mounted on said support, a chain-sprocket making part of said driving gear wheel, a hub of a road-wheel rotatable on said spindle, a driven gear wheel of variable pitch-diameter fixed to said hub and meshing with said inwardly extending teeth of the driving gear wheel, a driving chain cooperating with said chain sprocket, and means mounted on said spindle and adapted to be moved only in parallel direction with respect to the plane of the pitch-circle of said gear wheels, to displace said support transversely to the main direction of said driving chain and to vary simultaneously through corresponding extents the pitch-radius of said driven gear wheel.

4. A change speed gear for cycles comprising in combination a spindle for a road-wheel, a support radially displaceable on said spindle, a cam portion on said support, a cam member rotatably mounted on said spindle and cooperating with said cam portion of said support, a driving gear wheel having inwardly extending teeth rotatably mounted on said support, a chain-sprocket making part of said driving gear wheel, a hub of a road wheel rotatable on said spindle, a driven road wheel gear wheel of variable pitch-diameter fixed to said hub and meshing with said inwardly extending teeth of the driving gear wheel, said gear wheel of variable pitch diameter comprising a pitch diameter regulating member rotatable with respect to said hub, and means on said rotatable cam member, such means cooperating with said regulating member of said gear wheel of variable pitch diameter.

5. A change speed gear for cycles comprising in combination a spindle for a rear-road-wheel, a driving gear ring having inwardly extending teeth and making part of a chain-sprocket, said driving gear ring and sprocket being rotatably supported by a disc located inside of said chain sprocket and radially displaceable on said spindle, a cam-portion on said disc, a cam-lever rotatably mounted on said spindle and cooperating with said cam-portion of said support, a rear-road-wheel-hub rotatable on said spindle, a driven gear-wheel of variable pitch-diameter fixed to said hub and meshing with said inwardly extending teeth of the driving gear wheel, said gear wheel of variable pitch-diameter comprising a pitch-diameter regulating disc with a toothed periphery, rotatable with respect to said hub, a toothed member articulated to said cam-lever and cooperating with the toothed periphery of said regulating disc, and means for simultaneously actuating said cam-lever and said toothed member articulated to the cam-lever.

JOSEPH CAHN.